(12) United States Patent
Springer et al.

(10) Patent No.: US 8,488,844 B2
(45) Date of Patent: Jul. 16, 2013

(54) DEVICE AND A METHOD FOR PROVIDING INFORMATION ABOUT ANIMALS WHEN WALKING THROUGH AN ANIMAL PASSAGE

(75) Inventors: Andreas Springer, Beckum (DE); Karsten Schönrock, Hagen (DE); Elmar Nieswand, Herne (DE); Manfred Pohlkamp, Oelde (DE); Heinz Francke, Oelde (DE)

(73) Assignee: GEA Farm Technologies GmbH, Boenen (DE)

( * ) Notice: Subject to any disclaimer, the term of this patent is extended or adjusted under 35 U.S.C. 154(b) by 420 days.

(21) Appl. No.: 12/452,914

(22) PCT Filed: Jul. 29, 2008

(86) PCT No.: PCT/EP2008/059948
§ 371 (c)(1), (2), (4) Date: May 17, 2010

(87) PCT Pub. No.: WO2009/016183
PCT Pub. Date: Feb. 5, 2009

(65) Prior Publication Data
US 2010/0246970 A1    Sep. 30, 2010

(30) Foreign Application Priority Data

Jul. 31, 2007   (DE) .......................... 10 2007 036 294

(51) Int. Cl.
*G01K 9/00*    (2006.01)
*A01K 45/00*   (2006.01)

(52) U.S. Cl.
USPC ........................................ 382/110; 119/14.02

(58) Field of Classification Search
USPC .......... 382/110; 340/572.1, 573.1; 119/14.02, 119/14.03, 14.08, 200, 421, 14.01, 14.25, 119/520; 426/491, 570, 583, 587, 588
See application file for complete search history.

(56) References Cited

U.S. PATENT DOCUMENTS 3,974,798 A * 8/1976 Meetze, Jr. .................... 119/421
5,195,455 A * 3/1993 van der Lely et al. ..... 119/14.03
(Continued)

FOREIGN PATENT DOCUMENTS

DE         103 51 911 A1     6/2005
DE    10 2007 055 704 A1     6/2008
(Continued)

OTHER PUBLICATIONS

English language Translated Description and Claims of 103 51 911 A1, European Patent Office's esp@cenet.com database, 5pp.
(Continued)

*Primary Examiner* — Abolfazl Tabatabai
(74) *Attorney, Agent, or Firm* — Smith Law Office

(57) ABSTRACT

The invention relates to a device and method for providing information about animals walking through an animal passage (I), the information comprising at least the number of animals walking through the animal passage, using a detection device having a sensor device connected to a processor for capturing animal data about animals walking through the animal passage, and an analysis device for recognizing animals in the data/signals captured by the sensor device for the purpose of outputting counter impulses when animals are detected in said signals, the sensor device being designed for producing 3D images, and the analysis device being designed for detecting animals in the 3D data of the 3D images and for counting the animals using said detection.

25 Claims, 13 Drawing Sheets

U.S. PATENT DOCUMENTS

| | | | |
|---|---|---|---|
| 6,167,839 B1 * | 1/2001 | Isaksson et al. | 119/14.08 |
| 6,286,460 B1 * | 9/2001 | Gudbjornsson | 119/200 |
| 7,490,576 B2 * | 2/2009 | Metcalfe et al. | 119/14.08 |
| 2009/0038551 A1 * | 2/2009 | Baker et al. | 119/14.02 |

FOREIGN PATENT DOCUMENTS

| | | |
|---|---|---|
| EP | 1 537 531 B1 | 3/2007 |
| WO | WO 03/039247 A1 | 5/2003 |
| WO | WO 03/059191 A2 | 7/2003 |
| WO | WO 2004/049790 A1 | 6/2004 |
| WO | WO 2007/064202 A1 | 6/2007 |

OTHER PUBLICATIONS

English language Abstract, Translated Description and Claims of 10 2007 055 704 A1, European Patent Office's esp@cenet.com database, 6pp.

PCT/IB/326, Notification Concerning Transmittal of International Preliminary Report on Patentability dated Feb. 11, 2010, 1p.

PCT/IB/373, International Preliminary Report on Patentability dated Feb. 11, 2010, 1p.

PCT/ISA/237, Written Opinion of the International Searching Authority (German) dated Feb. 11, 2010, 5pp.

PCT/IB/338, Notification of Transmittal of Translation of the International Preliminary Report on Patentability dated Apr. 1, 2010, 1p.

PCT/IB/373, International Preliminary Report on Patentability dated Apr. 1, 2010, 1p.

PCT/ISA/237, Written Opinion of the International Searching Authority (Translation) dated Apr. 1, 2010, 5pp.

* cited by examiner

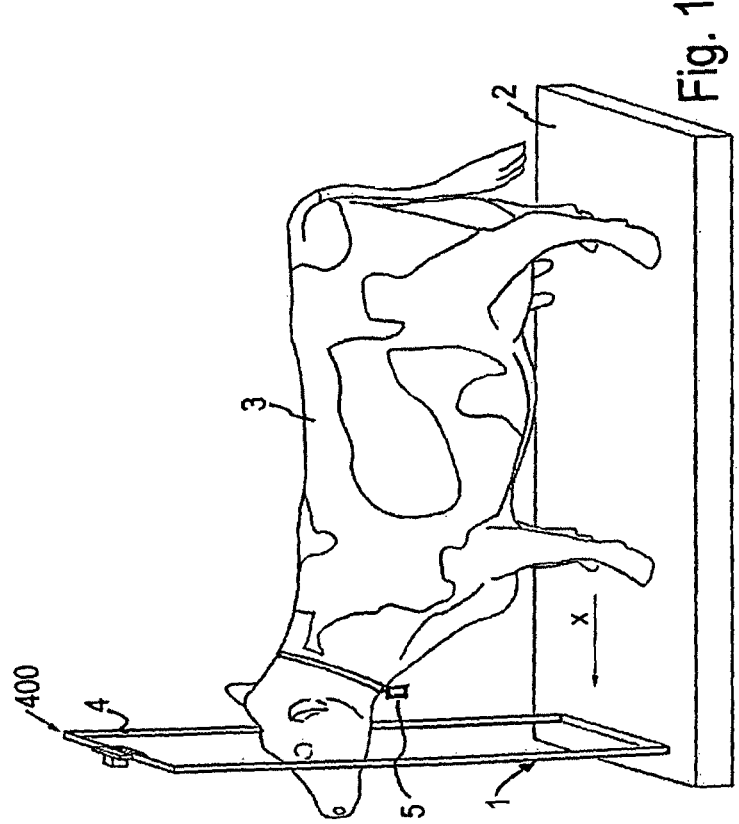

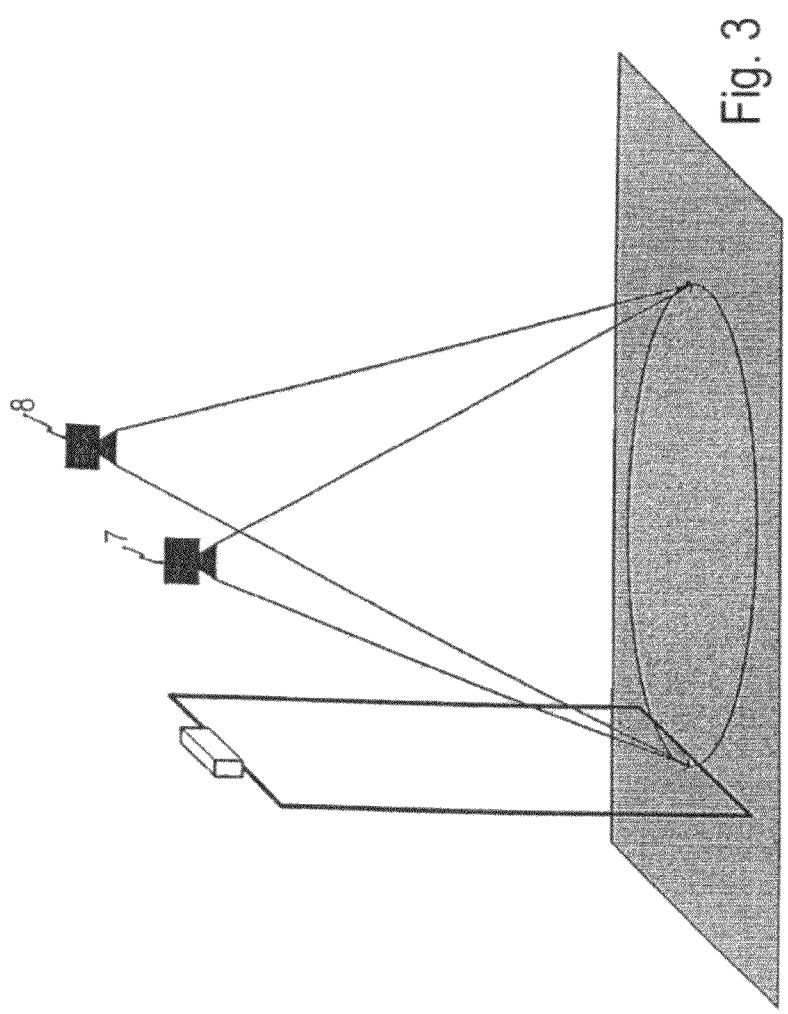

DEVICE AND A METHOD FOR PROVIDING INFORMATION ABOUT ANIMALS WHEN WALKING THROUGH AN ANIMAL PASSAGE

FIELD AND BACKGROUND OF THE INVENTION

The invention concerns a device and a method for providing information about animals when walking through an animal passage, whereby this information includes at least the number of animals walking through the animal passage.

A generic method and a generic device are known from DE 103 51 911 A1. The method proposed in this publication for recognition of the passage of animals when walking through an animal passage as entry to an automatic milking parlor comprises first an identification of the animals to be milked using an identification device. For example, this identification device is designed according to the manner of an RFID system, which comprises an emitter/receiver unit on a passage door or railing and a transponder or responder (both RFID tags) optionally with sensor, carried by the animals to be detected.

The electronic identification of animals using only such identification devices may result in detection problems in certain operational situations. Normally the animals enter the milking parlor through an entry area. This is where the identification device is located which serves for the individual identification of the animals. In this way, in a group milking parlor, an assignment between the animals to be milked and the milking stations can be carried out. Thus, the first animal that was recognized by the identification device is automatically assigned to the first milking station, the second animal to the second milking station, and so on.

However, if an animal has lost its detection mark or its responder or if this is defective, or if the detection is perturbed, it is not noted that an animal already physically occupies a milking station, and this appears to be free to the computer device which controls and manages the assignment of the milking station on the basis of a herd-management system or program.

As a result of this, for all subsequent animals of the series, there will be a shift between animal and milking station. The animals are in that case still milked, but the amounts of milk and the other data obtained under certain circumstances (milking duration, conductance, etc.), are discarded, in order to avoid the storage of incorrect data in the herd-management system.

In order to avoid this problem, in the generic DE 103 51 911 A it is therefore further proposed that the animals be counted independently of the identification of their responder, using a detection device which—based on a sensor system such as a photoelectric barrier or a camera—captures and counts the animals.

In this way it is achieved that a non-identified animal that stands at a milking station will nevertheless be included in the milking station occupation record so at least the subsequent identified animals will automatically be assigned to the correct milking stations.

Thus, the generic device has proven to be useful. However, it seems that it can still be optimized from the point of view of the design of the detection device. It turns out that exact counting of the animals proves to be difficult since unlike in the usual industrial processes they do not enter the milking parlor at regular distances from one another or at a regular velocity. Furthermore, it can occur that an animal remains standing in the detection area so that two animals enter the milking parlor placed directly one behind the other (FIG. 6) or sideways behind one another (FIG. 7) or that individual or several animals run into the milking parlor at high speed (indicated in FIG. 5). All these situations are difficult to capture.

Regarding the technological background, let us recall the following state of the art:

WO 03/039247 A1 concerns an installation for the control of the presence of an identification label (responder) with animals. An animal that cannot be identified when the identification label is missing should still be recognized in a reliable manner.

Additional devices must be used for this purpose: a detection device which determines whether the animal can be found in the animal recognition area and an additional discriminating device which marks the animal when it has no responder and correspondingly no signal was detected in the animal recognition area. This discriminating device can mark, for example, by spraying the animal that has lost its responder with paint, which is relatively expensive.

EP 1 537 531 B1 describes an image recording system and an image recording method for evaluation of the physical condition of animals. Hereby the body condition score (the numerical value BCS) is determined, whereby the method comprises the following three steps:

delineating a predetermined section of interest on the animal body and producing data that represent this;

processing the produced data in order to obtain a three-dimensional image of the section of interest and analyzing the three-dimensional design, in order to determine a predefined measurable parameter, whose surface relief represents the section of interest in order to indicate the state of the body.

WO 03/059191 concerns a method for reliable prediction of the body condition score (numerical value) for animals. The determined numerical value for the body condition score (BCS) can be used to determine the correct food rations for domestic animals.

WO 2004/049790 concerns a device for the detection of an animal with a body part and a head part, whereby parameters are determined that refer to the size of the cross section of the animal at a specific position in the passage.

Based on this background, starting from the generic description, the invention has first of all the task to further develop the generic device and the generic method in such a way that the number of erroneous assignments during the occupation of the milking station is minimized and as many data as possible are obtained about the animal.

With regard to the method according to the invention for providing information about animals when they walk through an animal passage with a device according to the invention, with the detection device, animal data of the animals walking through the animal passage are captured and evaluated with the evaluation device and counting pulses are produced based on this evaluation in order to set an animal counter of the evaluation device or processor, whereby the detection of the animals comprises at least the steps of producing 3D data from 3D images of the animals or of partial areas of the animals and an evaluation of these 3D data to produce at least the counter pulse.

Furthermore, preferably the method comprises identification of the animals with the aid of an identification device, optionally directly from data obtained by the detection device.

Furthermore, preferably the method includes determination of another animal parameter from the data obtained by the detection device, whereby the additional animal parameter can be a parameter that characterizes the state of the health of the animal, which is determined from the 3D images.

It is expedient for the additional animal parameters to be continuously stored in a database during each milking process.

The device increases the detection rate during passage recognition in a simple manner. In addition, with the device, detection at individual stations can be omitted in large milking parlors.

SUMMARY OF THE INVENTION

According to the invention, a device is conceived with which the animals walking through can be counted with great accuracy. Moreover, additional information can be obtained about the detected animals. The detection device is designed so that the number of incorrect countings/falsely assigned milking stations is significantly reduced. Since such errors in assignment during the recording of the milking processes can be corrected by an appropriate data processing program in combination with the device according to the invention, the efficiency of a milking parlor provided with the invention can be increased. Thus, one can achieve an assignment accuracy which is necessary for "precision livestock farming".

Whereas in the evaluation of 2D data due to the low contrast and the constantly-changing surrounding conditions, errors may occur—animals are not recognized as such and thus are not counted—this problem no longer occurs in the evaluation of 3D data or at least it occurs only to a greatly reduced degree.

The detection device of the invention makes it possible to at least count the animals, but in addition it can be used for other detection tasks—for example recognition of the state of nutrition and/or the detection of lameness.

Thus it is advantageous when the captured data are used also for obtaining statements regarding the state of health of the animals. Of course it is known that 3D images of animals can be produced in order to obtain conclusions about the state of health of the animals. However, the invention provides the advantages that during the passage identification, such 3D images can be obtained continuously so that continuous observation of the state of health of the animals becomes possible in a simple manner.

The detection device can be supplemented by an identification device for individual or individual biometric identification of the animals that were recognized as such "as an animal."

The 3D recording instruments of the detection device are installed preferably spatially near the identification device when such is provided. They can be arranged spatially before or after the identification device, preferably they are arranged in front of these in the direction of movement of the animals.

When an animal enters the area before or after the identification device, one or several 3D images are produced by the detection device.

Then the 3D images are used to determine if only one or several animals are located in the recording area. The produced counter pulse corresponds to the determined number of animals. Then the information is outputted about the number of animals that have walked through the entry area in the direction of the milking station.

Alternatively, it is conceivable to obtain recordings continuously at short time intervals in order to check if there are any animals in the area of the detection device.

In this way it is also possible to utilize the device according to the invention only or also alone as a stand-alone animal counter, for example for meat animals, without any identification device. Here, then, only the counter pulses are counted in order to determine the number of animals.

However, preferably, the device is complemented by an identification device, for example, according to the type of DE 103 51 911 A1, and the counting information is linked to the parameters determined by the identification device, which makes especially reliable herd management possible and thus creates the necessary prerequisites for "precision livestock farming".

Due to the high accuracy of the 3D measurement, a number of other types of information can be obtained.

Thus, for example, the width of the animal at various locations, the length and/or the (walking) speed can be determined. From this, animal-specific characteristics (biometric properties) can be found and stored. With the incorporation of the third dimension, however, very accurate data can be obtained and thus in the evaluation there are no problems because of lacking contrast or because of various environmental influences.

Due to the high accuracy, using the 3D images, criteria about the state of nutrition of the animals can be investigated. Especially, as a special form thereof, the BCS (body condition scoring) can be determined. In this way, long-term monitoring of health, nutrition or the success of feeding can be carried out in the herd management.

By a situation-dependent determination of the walking speed of animals one can obtain indices for health control, for example, lameness.

Moreover, through an accurate image analysis under certain circumstances an injury can be recognized. This is possible by automating the obtained 3D image directly or by evaluating it visually. In the image the injury can be determined directly or, for example, through determining any attack by flies.

Furthermore, it is conceivable to determine through the reflection properties of the animal if, for example, it sweats profusely. For example, if this is the case in many animals, automatic sprinkling or blowing can be started or generally information can be obtained about the fact that the stall climate is not optimal.

With the invention it becomes possible to assign the obtained data unequivocally to the particular animal. That is, over days, weeks, months, a number of data can be recorded (for example all the ones described so far) for the particular animal, and for example stored in a herd management system. Thus, an extensive database is created and automatic evaluation based on historical data and current data becomes possible.

Then this database can be used for example when an animal was counted or recorded with the device and not recognized with the classical detection technology (for example RFID tag lost or defective) in order to provide a comparison of the currently obtained data with the data in the database to identify the animal or in case of a non-unequivocal identification to provide the farmer with a selection of possible animals.

Moreover, it is conceivable through the numerous data and their high accuracy for the detection system to be used as a stand-alone identification system and for the identification of the animals also to be carried out directly via the detection device.

The use of a great variety of sensors suitable for producing 3D images is possible. The use of a 3D camera (especially a 3D-direct camera, based on a "time of flight" measurement), stereography or laser triangulation with laser light-section procedures seem to be especially suitable.

The invention will be described in more detail below with the aid of practical examples with reference to the drawing. The following are shown:

BRIEF DESCRIPTION OF THE DRAWINGS

FIG. 1 is a perspective view of an animal passage with a 3D camera and an identification device and an animal walking through the animal passage;

FIG. 2b is a recording of animals passing through the animal passage of FIG. 2a;

FIG. 3 is a third animal passage;

DETAILED DESCRIPTION OF THE PREFERRED EMBODIMENTS

Images with cows are shown as example. However, the device and the method of the invention are suitable for other animals in addition, especially for milkable animals, for example sheep and goats and for non-milkable animals such as pigs.

Figure 12:
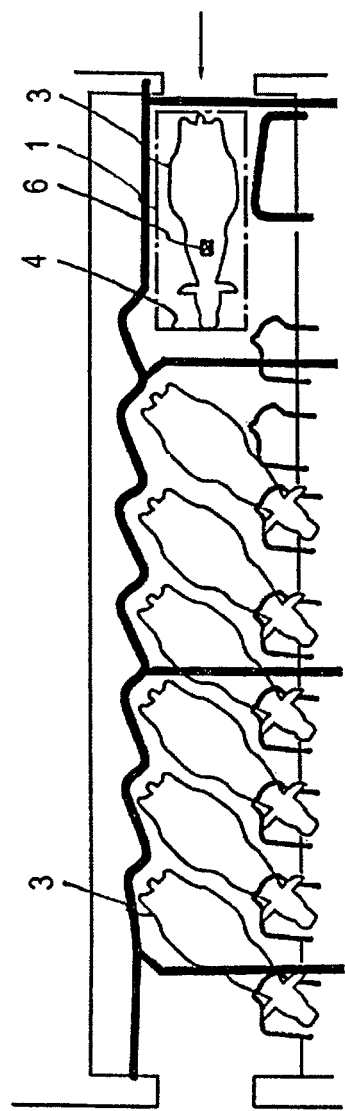
FIG. 12 shows a schematically represented milking parlor with an animal passage according to FIG. 1 and FIG. 13a-d show additional block diagrams to illustrate a fundamental structure of a device according to the invention.

FIG. 1 shows an animal passage 1 with a floor 2 on which an animal—here a cow 3 to be milked—walks in the forward direction X. The animal passage may be bordered on the side by walls not shown here. FIG. 12 shows a top view onto a milking parlor with such an animal passage 1.

Figure 8A:
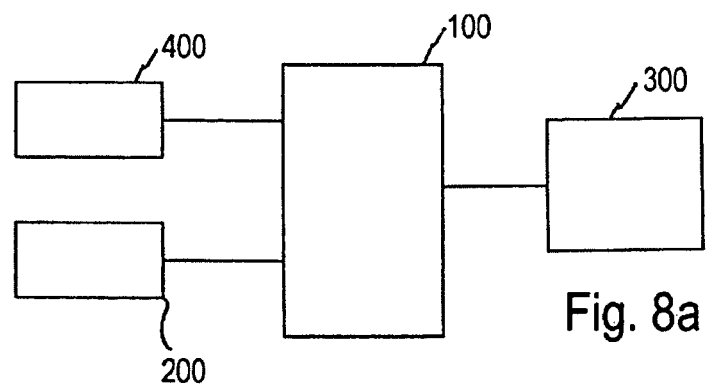
FIGS. 8a, b are block diagrams for illustrating a basic construction of a device according to the invention.
Figure 8B:
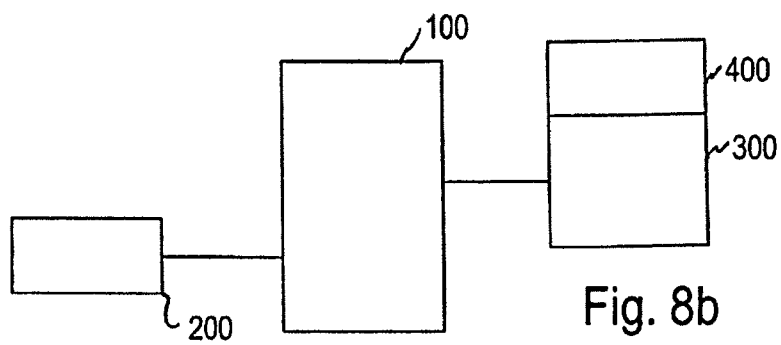

The animal passage is provided with a device for providing information about animals as they walk through an animal passage, as shown schematically in FIG. 8a or 8b as well as in 13a-d.

This device for providing information about animals walking through an animal passage has a processor 100 (preferably a data-processing device with input and output equipment and a central processing unit, to which a memory is assigned and which is provided with a program).

Furthermore, the device comprises a detection device 200 connected to the processor 100 with a sensor device for capturing animal data of the animals walking through the animal passage and an evaluation device 300 for collecting and summation of the counter pulses with an aid of the evaluation of the animal data provided by the detection device, which can be a self-contained program or a part of the program running on the processor unit.

The detection device 200 is designed to produce 3D images of the animals, whereby, using a suitable image analysis method (of the evaluation device 300) the animals are captured in the 3D images. With each capturing a counter pulse is produced or a corresponding counter is advanced and stored.

Preferably, furthermore, the device has an identification device 400 for identifying the animals counted or captured with the detection device 200.

This identification device 400 can be represented by the detection device 200 (or evaluation device) itself by using the precise animal images captured with the detection device 200 for the identification of the animals too, using a comparison with the older images stored in the data processing device 100 (FIG. 8b).

However, the identification device can be realized in other ways, such as according to FIG. 1 (the representation in FIG. 8a corresponds to this).

According to FIG. 1, the identification device 400 comprises identification frames 4, acting as emitter and/or receiver, which is designed to read wireless data from an RFID component 5 (preferably a responder) which is shown here only schematically, carried by the cow, and preferably data can also be written on this RFID component 5 if needed. The identification frame 4 is to be dimensioned so that the animals to be identified can pass through it.

The detection device 200 is assigned to the identification device 400, of which a 3D camera 6 is shown schematically as sensor device in FIG. 1. The camera itself may also contain this evaluation device.

The device according to FIG. 13 comprises the detection device 200 connected to the processor 100 with a sensor device 210 for capturing animal data of the animals walking through the animal passage and with evaluation device 220 in which the 3D data detected are evaluated using a suitable image analysis method. The detection device 200 is connected to another evaluation unit 500, which captures the data transmitted from the detection device 200 and processes them further. Thus, for example, counter pulses can be detected and added up. This evaluation unit 500 can be a separate device (FIG. 13a) or a component of the program running in the processor 100 (FIG. 13b).

Figure 13A:
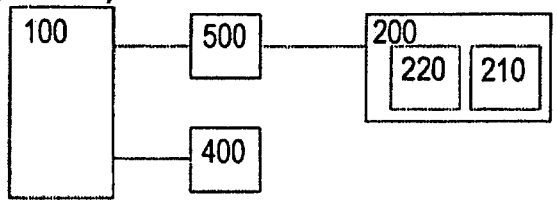
Figure 13B:
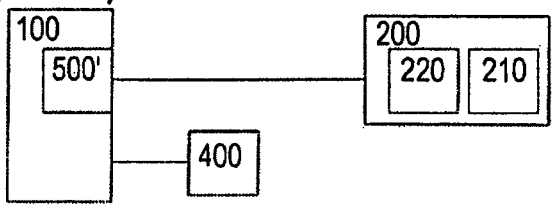
Figure 13C:
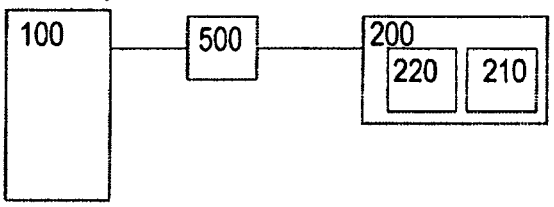
Figure 13D:
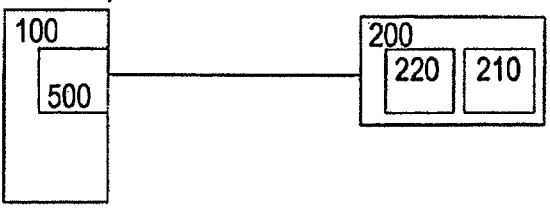

The identification device 400 can also be formed by the detection device 200 and other sensors (for example color cameras) themselves, by using the sensors in the detection device 20 and possibly additional existing sensors that produce precise animal images also for the identification of the animals with the aid of a comparison with older images stored in the data processing device 100 (FIGS. 13c and d).

Normally the animals enter the milking parlor through an entry area. Then the device of FIG. 1 is located here. The detection device 200 can be arranged in the direction of movement X spatially before or after the identification device, preferably it is arranged in the direction of movement X before this.

Figure 2B:
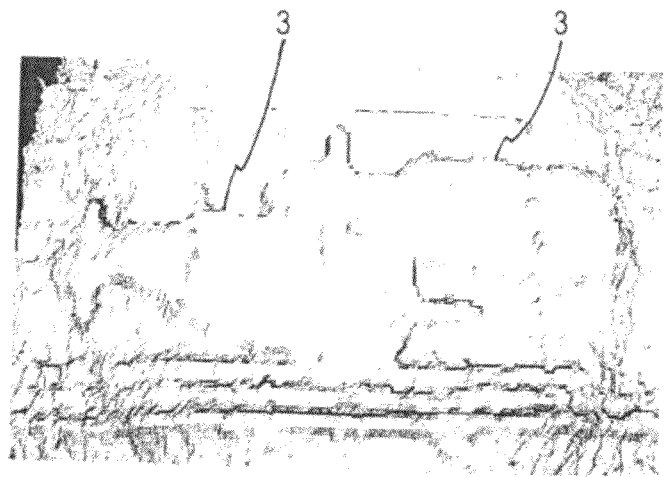
Figure 9:
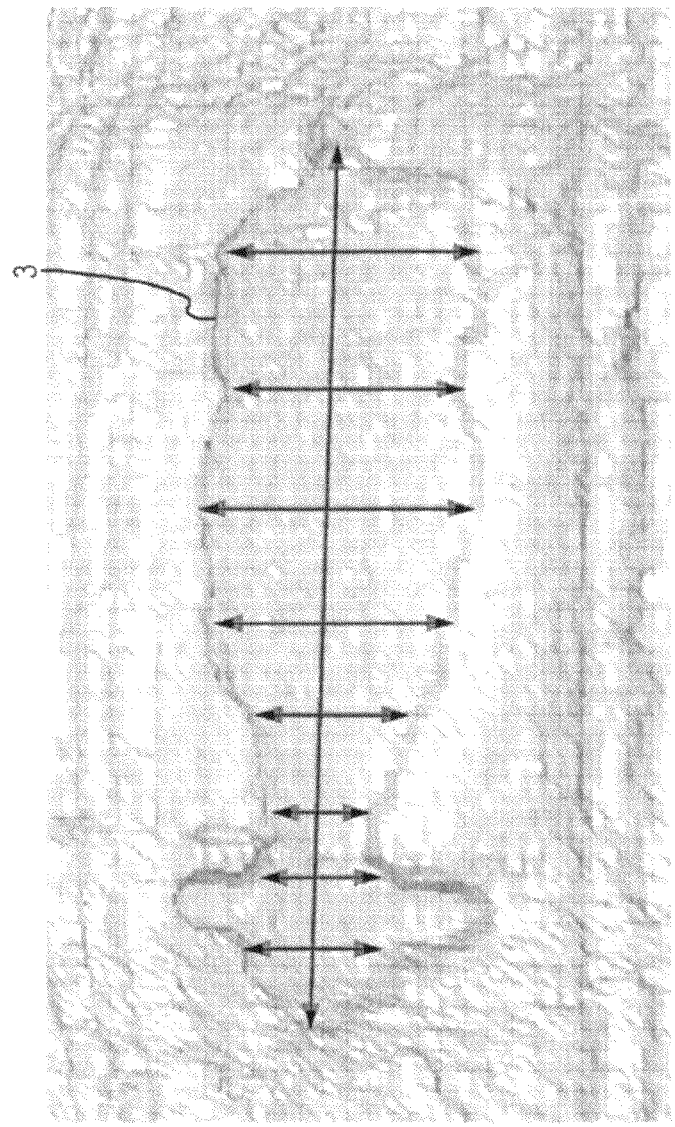
FIGS. 9, 10 are images recorded with a 3D camera.
Figure 10:
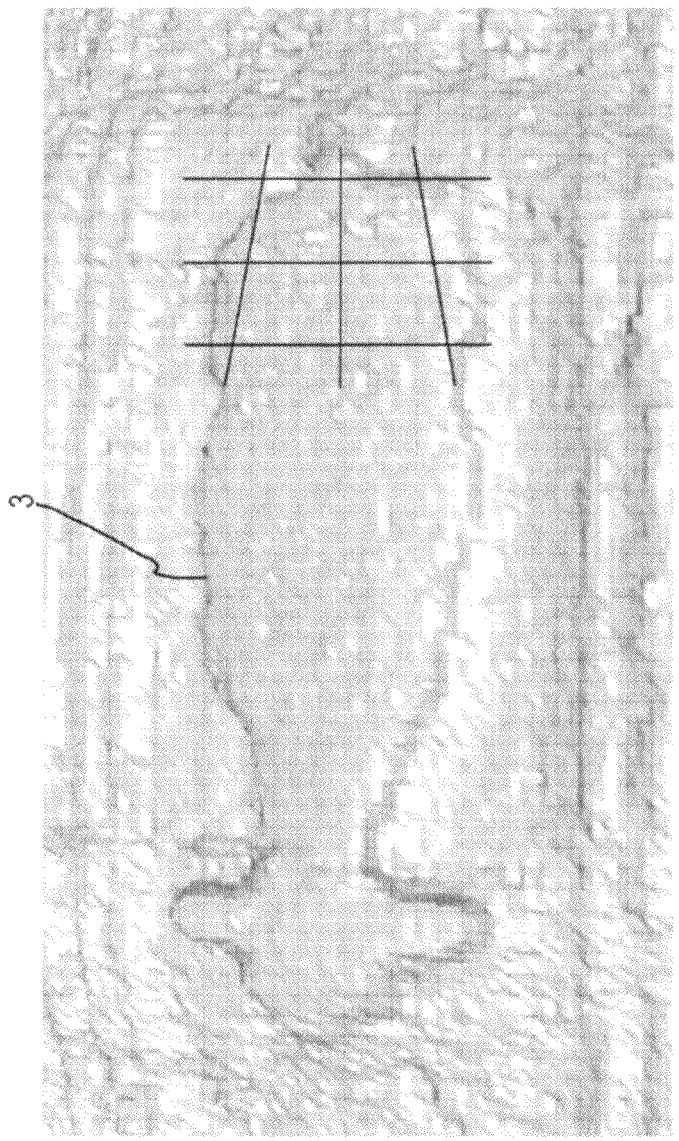
Figure 11:
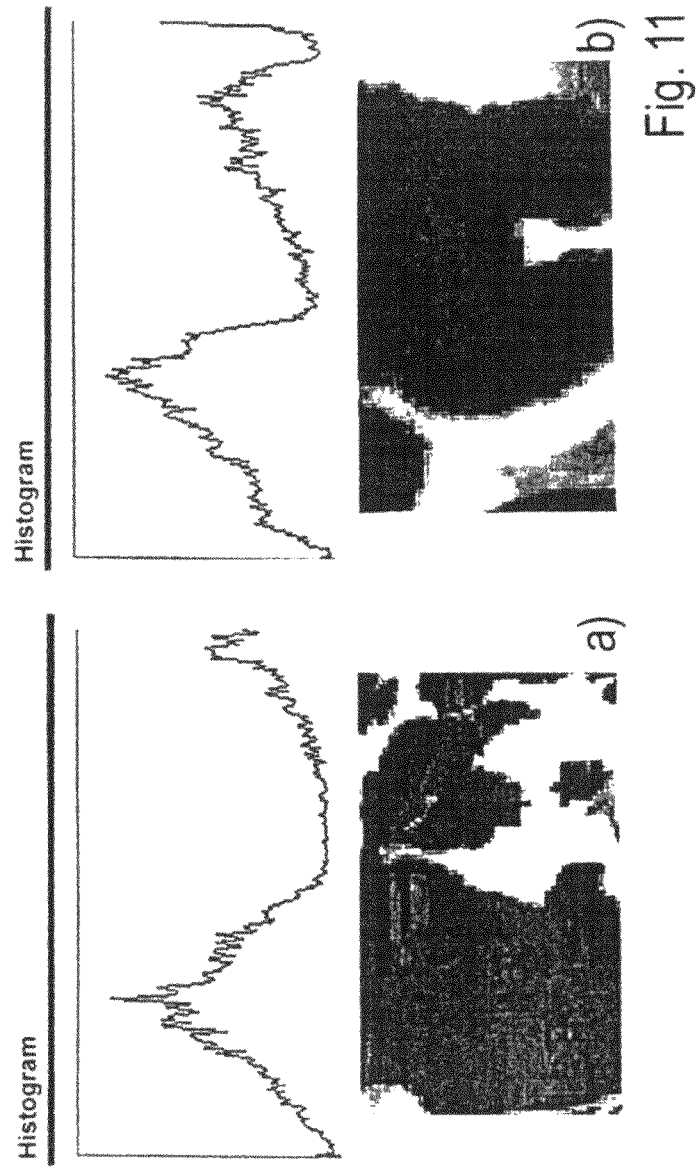
FIG. 11 shows animal images and corresponding recording histograms.

When an animal now enters the area before or after the identification device 400, several 3D images are produced with the detection device 200 (See FIGS. 2b and 9 and 10).

These 3D images are evaluated with the aid of an image analysis method in order to determine whether one or several animals are imaged on the recording. Especially, it is possible to recognize even the problem cases according to FIGS. 5 to 7 and still determine the number of animals correctly in an automated manner.

Then the output of the information of the number of animals that walked through the entry area in the direction of the milking parlor is performed.

Figure 5:
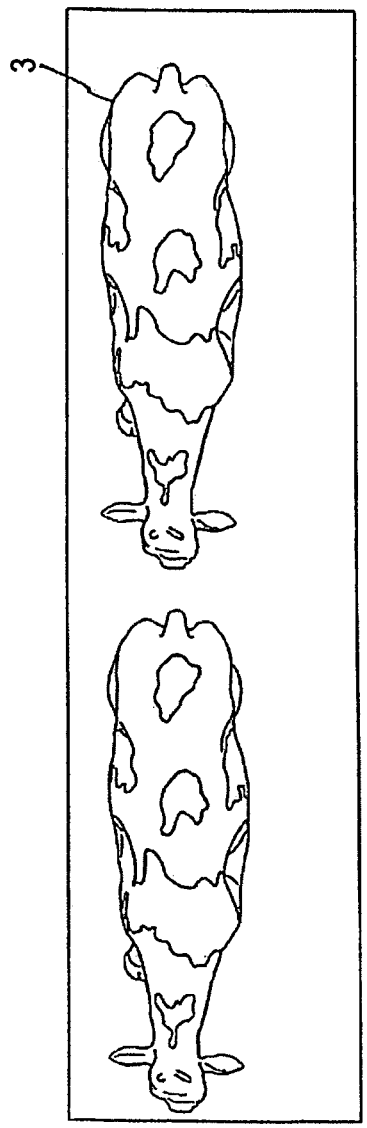
FIGS. 5-7 are top views onto animals as they walk through an animal passage to illustrate the situations that can be detected with the detection device according to the invention.
Figure 6:
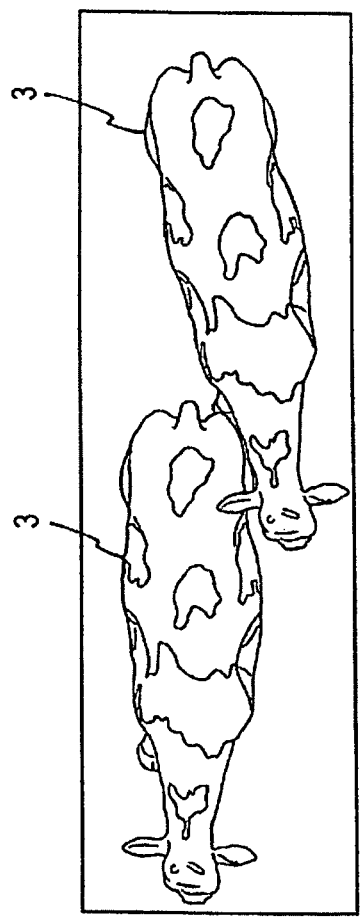
Figure 7:
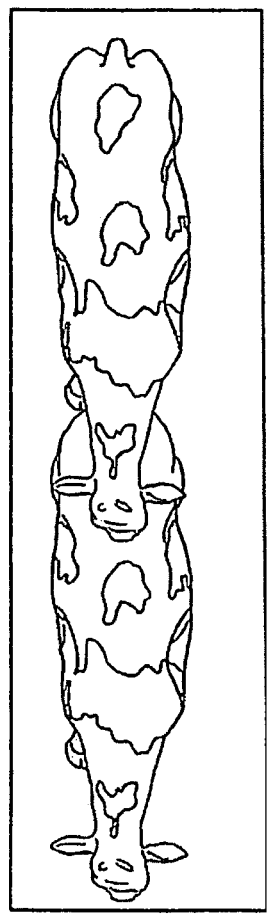

By the use of a 3D camera, stereography or laser triangulation with the laser light section procedure (or generally a 3D recording), counting of the animals can be performed in all normal operating situations, even in those shown in FIGS. 5 to 7, at a low error rate. Moreover, a number of additional items of information can be obtained.

The capturing of the 3D data can be done in different ways.

Figure 2A:
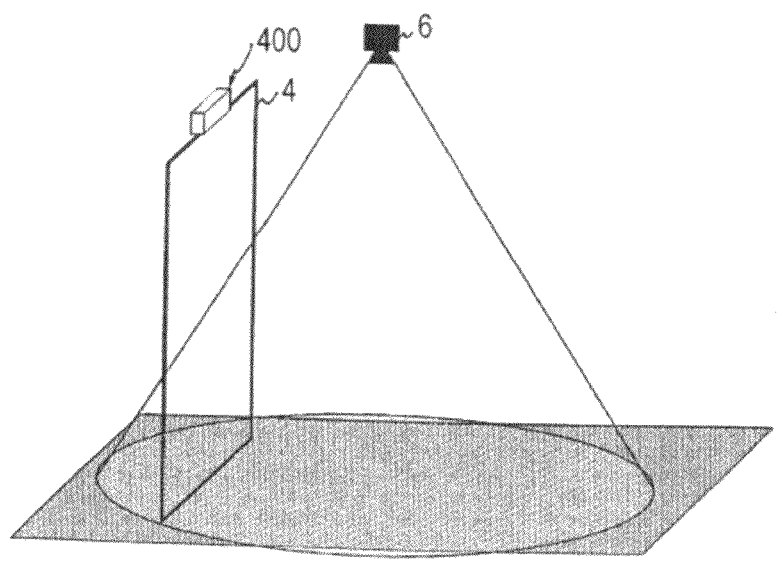
FIG. 2a is a second animal passage.

According to FIG. 2a, in order to produce the 3D images, a 3D camera 6 is used that is designed so as to produce and store direct 3D information per image pixels. This is indicated in FIGS. 2a and b. Here, in contrast to 2D images, not only the reflected image information is recorded but the distance information as well on the image pixel plane. For this purpose deliberately modulated light is emitted and the length of time is measured until a photon is received by the camera (time of flight measurement).

According to FIG. 3, a stereographic arrangement is used. This comprises at least two cameras 7, 8 that are arranged at a fixed distance from one another in order to generate a 3D image. In stereography, as it is known, two images are recorded from different positions. In order not to have to move the camera into the two different positions, the images are preferably recorded with two cameras 7, 8 which are arranged at a fixed distance to one another. The 3D image is produced by data-technological linking of the two images.

Figure 4:
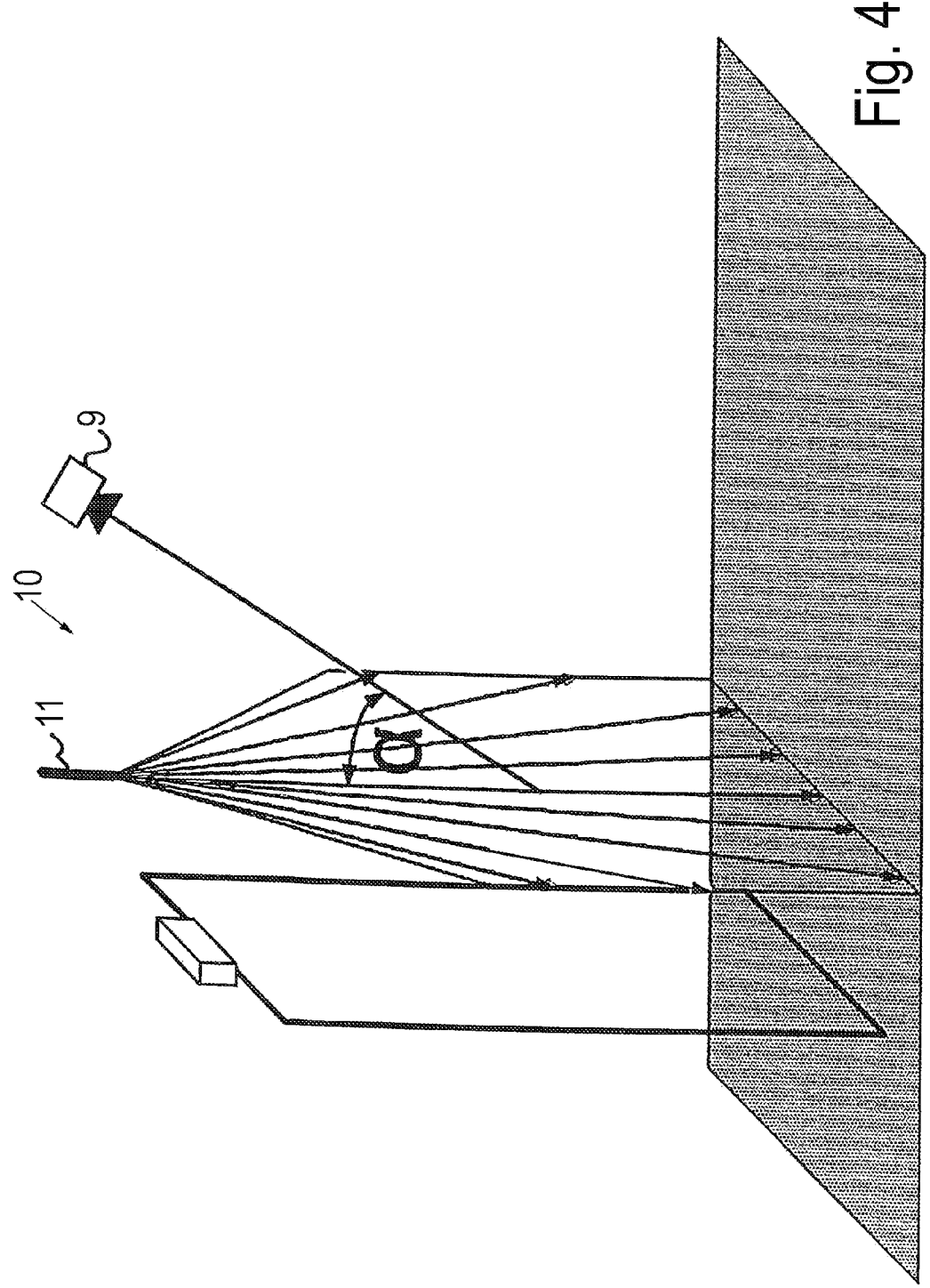
FIG. 4 is a fourth animal passage.

According to FIG. 4, an arrangement 10 is used for laser triangulation with laser light sections. Using a projected laser beam of a laser 11, a light section is produced which is again evaluated with a camera 9 located at a fixed angle to laser 11. This is shown in FIG. 4. The laser 11 and the camera 9 are mounted at a fixed distance to one another. The laser light source projects for example a laser beam (also called radiation curtain). When a body now enters this beam, then it is "cut" and the reflections are recorded by the camera. The distance can be calculated based on the angle α.

The cameras 6, 7, 8, 9 are preferably arranged above the animal.

The invention claimed is:

1. A device for providing information about a plurality of animals as they move through an animal passage, the device comprising:
   a sensor device that senses three-dimensional image data about an animal in the animal passage; and
   a processor for receiving the three-dimensional image data from the sensor device wherein the processor includes a direct identification device for comparing three-dimensional images produced using the three-dimensional image data from the sensor device to stored historical data; and
   an evaluation device for processing the three-dimensional image data from the sensor device to distinguish individual animals in the animal passage using the three-dimensional image data and to emit a counter pulse corresponding to the individual animal.

2. The device according to claim 1, wherein the sensor device comprises at least one camera.

3. The device according to claim 1, wherein the sensor device comprises:
   an illumination device that obtains the three-dimensional image data; and
   a two-dimensional camera using a time of flight measurement.

4. The device according to claim 1, wherein the sensor device comprises:
   a stereograph detector.

5. The device according to claim 1, wherein the sensor device comprises:
   a plurality of cameras spaced apart from one another to generate stereographic images.

6. The device according to claim 1, wherein the sensor device comprises:
   a laser triangulation device.

7. The device according to claim 1, and further comprising:
   an identification device for identifying a specific animal in the animal passage.

8. The device according to claim 7, wherein the identification device comprises:
   a data reader for reading data from an identification tag connected to an animal in the animal passage.

9. The device according to claim 7, wherein the identification device comprises:
   a radio frequency data reader.

10. The device according to claim 1, wherein the evaluation device evaluates animal-specific data from the three-dimensional image data.

11. The device according to claim 1, wherein evaluation device determines nutrition data from the three-dimensional image data.

12. The device according to claim 11, wherein the processor processes and stores state of nutrition data for animals that move through the animal passage.

13. The device according to claim 11, wherein the processor generates data signals to be used for automatic feed optimization for animals by using the determined nutrition state data.

14. The device according to claim 11, wherein the processor generates a tabulated output of nutrition data for at least one animal.

15. The device according to claim 11, wherein the processor generates an alarm when nutrition data deviates from a predetermined nutritional state.

16. The device according to claim 11, wherein nutrition data are determined, processed, and stored according to an evaluation scheme of a body condition score for a corresponding animal.

17. The device according to claim 1, wherein the processor comprises:
   controls for moveable devices on a milking robot.

18. A dairy animal milking installation having a dairy animal passage through which dairy animals move, the dairy animal milking installation including a device for providing information about a dairy animal as it moves through the dairy animal passage, the device comprising:
   a sensor device that senses three-dimensional image data about a dairy animal in the dairy animal passage;
   a processor for receiving the three-dimensional image data from the sensor device
   wherein the processor includes a direct identification device for comparing three-dimensional images produced using the three-dimensional image data from the sensor device to stored historical data; and
   an evaluation device for processing the three-dimensional data from the sensor device to distinguished the number of dairy animals and to output counter pulses upon recognition of the number of dairy animals corresponding to the three-dimensional data.

19. A method for providing information about dairy animals as they move through a dairy animal passage, the method comprising:
   detecting an animal;
   sensing data corresponding to an individual dairy animal being detected;
   producing a three-dimensional image from the data corresponding to the dairy animal;
   comparing the three-dimensional images to stored historical data; and
   evaluating the three-dimensional images to determine a physical characteristic of the dairy animal.

20. The method of claim 19, wherein the step of producing a three-dimensional image comprises the step of:
   producing a three-dimensional image of at least part of the dairy animal; and the method further comprising the steps of:

evaluating the three-dimensional image; and producing counter pulses corresponding to the evaluation of the three-dimensional image.

21. The method according to claim 19, and further comprising the step of:

identifying the dairy animal with an identification device.

22. The method according to claim 19, and further comprising the step of:

identifying the dairy animal from the three-dimensional image.

23. The method according to claim 19, and further comprising the step of:

determining a plurality of dairy animal parameters from the three-dimensional image.

24. The method according to claim 23, wherein one of the dairy animal parameters is a parameter corresponding to the state of health of the dairy animals.

25. The method according to claim 23, and further comprising the step of:

storing at least one of the dairy animal parameters in a database during a milking process.

\* \* \* \* \*